(12) United States Patent
Xiong et al.

(10) Patent No.: US 12,360,652 B2
(45) Date of Patent: Jul. 15, 2025

(54) INTERACTION METHOD AND APPARATUS FOR MEDIA OBJECT IN MEDIA LIBRARY, AND ELECTRONIC DEVICE

(71) Applicant: NETEASE (HANGZHOU) NETWORK CO., LTD., Zhejiang (CN)

(72) Inventors: Xiongbin Xiong, Zhejiang (CN); Juan Zhang, Zhejiang (CN); Peijing Ye, Zhejiang (CN); Maoqiang Liu, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 32 days.

(21) Appl. No.: 18/255,604

(22) PCT Filed: Jan. 18, 2021

(86) PCT No.: PCT/CN2021/072504
§ 371 (c)(1),
(2) Date: Jun. 2, 2023

(87) PCT Pub. No.: WO2022/116373
PCT Pub. Date: Jun. 9, 2022

(65) Prior Publication Data
US 2023/0409169 A1 Dec. 21, 2023

(30) Foreign Application Priority Data
Dec. 4, 2020 (CN) .................. 202011403222.X

(51) Int. Cl.
*G06F 3/0482* (2013.01)
*G06F 3/04842* (2022.01)
*G06F 3/04847* (2022.01)

(52) U.S. Cl.
CPC ........ *G06F 3/0482* (2013.01); *G06F 3/04842* (2013.01); *G06F 3/04847* (2013.01)

(58) Field of Classification Search
CPC ............... G06F 3/0482; G06F 3/04847; G06F 3/04842; G06F 3/0488; G06F 3/04845; G06F 9/451
See application file for complete search history.

(56) References Cited

U.S. PATENT DOCUMENTS 5,706,097 A * 1/1998 Schelling ............... G03B 31/06
358/401
6,522,354 B1 * 2/2003 Kawamura ............ H04N 23/62
386/E5.072

(Continued)

FOREIGN PATENT DOCUMENTS

CN 103458016 A 12/2013
CN 103677529 A 3/2014

(Continued)

OTHER PUBLICATIONS

International Search Report dated Aug. 26, 2021 of International Application No. PCT/CN2021/072504.

(Continued)

*Primary Examiner* — Irete F Ehichioya
*Assistant Examiner* — Phoebe X Pan
(74) *Attorney, Agent, or Firm* — Qinghong Xu

(57) ABSTRACT

An interaction method for a media object in a media library includes: displaying on a graphical user interface provided by a terminal the media object in the media library; displaying on the graphical user interface an overview panel, and displaying on the overview panel an overview indicator corresponding to the media object; performing, in response to an interaction operation on the media object, a corresponding state change on the media object, and determining a display parameter of the corresponding overview indica- (Continued)

tor; and updating, according to the display parameter of the overview indicator, a display effect of the corresponding overview indicator to characterize a state of the media object by means of the overview indicator having different display parameters on the overview panel.

19 Claims, 5 Drawing Sheets

(56) References Cited

U.S. PATENT DOCUMENTS

| | | | | |
|---|---|---|---|---|
| 6,700,612 | B1* | 3/2004 | Anderson | H04N 1/0035 |
| | | | | 386/E5.072 |
| 7,593,035 | B2* | 9/2009 | Okamoto | H04N 1/00453 |
| | | | | 348/207.1 |
| 7,698,657 | B2* | 4/2010 | Gemmell | G06F 16/9038 |
| | | | | 715/833 |
| 7,847,851 | B2* | 12/2010 | Choi | G03B 19/00 |
| | | | | 715/768 |
| 2002/0000998 | A1* | 1/2002 | Scott | H04N 19/63 |
| | | | | 375/E7.04 |
| 2003/0033296 | A1* | 2/2003 | Rothmuller | G06F 16/958 |
| 2005/0041035 | A1* | 2/2005 | Nagatomo | G06T 3/40 |
| | | | | 345/530 |
| 2005/0091596 | A1* | 4/2005 | Anthony | G11B 27/34 |
| | | | | 715/848 |
| 2005/0210403 | A1* | 9/2005 | Satanek | G06F 3/04855 |
| | | | | 715/833 |
| 2006/0026523 | A1* | 2/2006 | Kitamaru | G06F 3/0481 |
| | | | | 715/708 |
| 2008/0155458 | A1* | 6/2008 | Fagans | H04N 1/00442 |
| | | | | 707/E17.03 |
| 2008/0301584 | A1 | 12/2008 | Akagi et al. | |
| 2009/0319897 | A1* | 12/2009 | Kotler | H04N 1/6013 |
| | | | | 715/838 |
| 2010/0174993 | A1* | 7/2010 | Pennington | G06F 3/0485 |
| | | | | 715/810 |
| 2010/0251165 | A1* | 9/2010 | Williams | G06F 16/904 |
| | | | | 715/833 |
| 2010/0278504 | A1 | 11/2010 | Lyons et al. | |
| 2011/0119712 | A1* | 5/2011 | Choi | H04N 21/6125 |
| | | | | 725/46 |
| 2014/0132634 | A1 | 5/2014 | Wang et al. | |
| 2015/0156247 | A1* | 6/2015 | Hensel | H04L 67/06 |
| | | | | 709/219 |
| 2018/0011580 | A1 | 1/2018 | Lebowitz et al. | |
| 2018/0267703 | A1 | 9/2018 | Kamimaru et al. | |
| 2022/0283700 | A1* | 9/2022 | Wada | G06F 9/451 |

FOREIGN PATENT DOCUMENTS

| | | |
|---|---|---|
| CN | 105204727 A | 12/2015 |
| CN | 105989180 A | 10/2016 |
| CN | 106371717 A | 2/2017 |
| CN | 107562338 A | 1/2018 |
| CN | 107797738 A | 3/2018 |
| CN | 109829070 A | 5/2019 |
| CN | 111064848 A | 4/2020 |

OTHER PUBLICATIONS

1st Office Action dated Oct. 18, 2021 of Chinese Application No. 202011403222.X.

2nd Office Action dated May 19, 2022 of Chinese Application No. 202011403222.X.

Notice of Allowance dated Apr. 25, 2023 of Chinese Application No. 202011403222.X.

* cited by examiner

INTERACTION METHOD AND APPARATUS FOR MEDIA OBJECT IN MEDIA LIBRARY, AND ELECTRONIC DEVICE

CROSS-REFERENCE

The present application is the U.S. national phase application of PCT Application No. PCT/CN2021/072504, filed on Jan. 18, 2021, which claims the priority to the Chinese Patent Application No. 202011403222.X, entitled "INTERACTION METHOD AND APPARATUS FOR MEDIA OBJECT IN MEDIA LIBRARY, AND ELECTRONIC DEVICE", filed on Dec. 4, 2020, and the entire contents of both of which are hereby incorporated by reference for all purposes.

TECHNICAL FIELD

Embodiments of the present disclosure relate to the technical field of interaction, and in particular to an interaction method and apparatus for a media object in a media library, an electronic device and a storage medium.

BACKGROUND

With the continuous development of internet technology, cell phones, tablets and other terminals are increasingly used in daily life, for example, users can manage, upload or share media objects such as photos and videos through social software on the terminals.

It should be noted that the information disclosed in the background section above is intended only to enhance the understanding of the background of the present disclosure, and may include information that does not constitute prior art known to those ordinary skilled in the art.

SUMMARY

In a first aspect, the embodiments of the present disclosure provide an interaction method for a media object in a media library. In these embodiments, a graphical user interface is provided through a terminal, and the method includes: displaying on the graphical user interface at least part of media objects in the media library; displaying on the graphical user interface an overview panel while displaying the media object, and displaying on the overview panel an overview indicator corresponding to the media object; performing, in response to an interaction operation on the media object, a corresponding state change on the media object, and at the same time, determining a display parameter of the corresponding overview indicator; and updating, according to the display parameter, a display effect of the corresponding overview indicator to characterize a state of the media object by means of the overview indicator having different display parameters on the overview panel.

In a second aspect, the embodiments of the present disclosure provide an electronic device, including a processor, a memory and a computer program stored in the memory and capable of running on the processor, wherein the computer program, when executed by the processor, implements steps of the method according to the first aspect.

In a third aspect, the embodiments of the present disclosure provide a computer-readable storage medium, storing a computer program, wherein the computer program, when executed by a processor, implements steps of the method according to the first aspect.

It should be understood that the above general description and the later detailed description are exemplary and explanatory only and do not limit the present disclosure.

BRIEF DESCRIPTION OF THE DRAWINGS

In order to provide a clearer explanation of the technical solutions in the embodiments of the present disclosure or in the prior art, a brief introduction will be made below to the accompanying drawings required in the description of the embodiments or the prior art. It is evident that the accompanying drawings in the following description are some embodiments of the present disclosure, and for those ordinary skilled in the art, other accompanying drawings may also be obtained based on these drawings.

DETAILED DESCRIPTION

Figure 1:
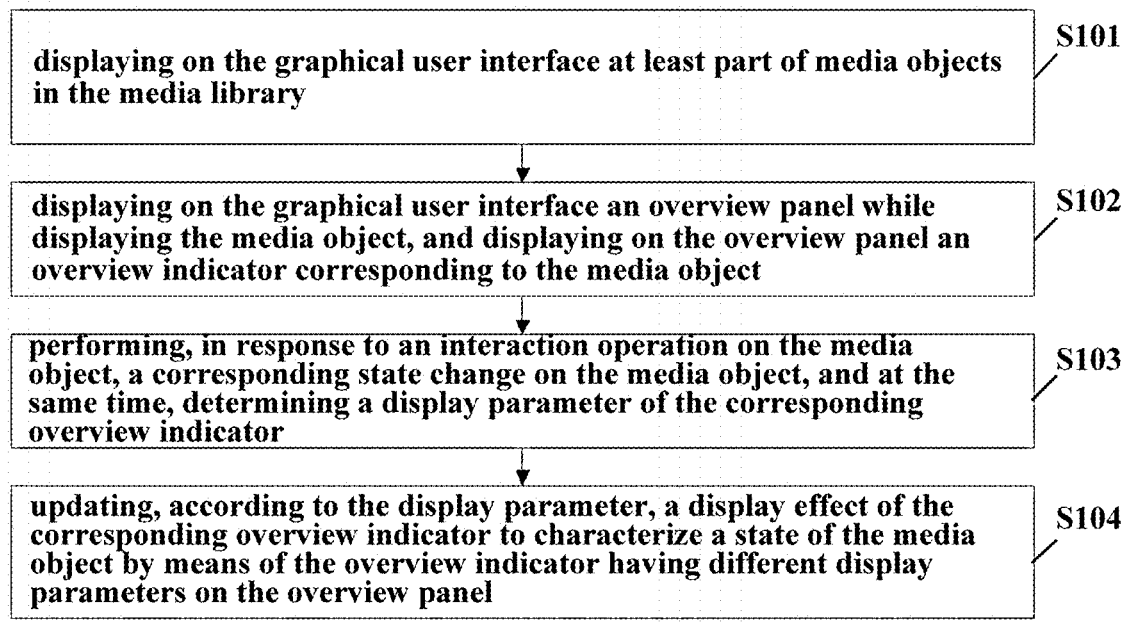
FIG. 1 is a flowchart of steps of an embodiment of an interaction method for a media object in a media library provided by an embodiment of the present disclosure.

In order to make the purpose, technical solutions and advantages of the embodiments of the present disclosure clearer, the technical solutions in the embodiments of the present disclosure will be described below in conjunction with the accompanying drawings in the embodiments of the present disclosure. Obviously, the described embodiments are a part of the embodiments of the present disclosure, and not all of them. Based on the embodiments in the present disclosure, all other embodiments obtained by those ordinary skilled in the art without making creative labor fall within the scope of protection of the present disclosure.

It should be noted that the terms "first", "second", etc. in various parts of the embodiments of the present disclosure and the accompanying drawings are used to distinguish similar objects, without necessarily describing a particular order or sequence. It should be understood that the data used in this way may be interchanged in appropriate cases, so that the embodiments of the present disclosure described herein may be implemented in an order other than those illustrated or described herein. In addition, the terms "include" and "provided with", and any variations thereof, are intended to cover non-exclusive inclusion. For example, for a process, method, system, product, or device that including a series of steps or units, it is not necessary to limit to those steps or units that are clearly listed, but may include other steps or units that are not clearly listed or inherent to those processes, methods, products, or devices.

The method flowcharts involved in the following embodiments of the present disclosure are exemplary illustrations only and do not have to include all content and steps, nor do they have to be performed in the order depicted. For example, some steps may also be decomposed, while some steps may be combined or partially combined, so that the actual order of execution may be changed according to the actual situation.

The functional modules in the block diagrams involved in the following embodiments of the present disclosure are merely functional entities and do not necessarily have to correspond to physically separate entities. That is, these functional entities may be implemented in software form, or in one or more hardware modules or integrated circuits, or in different networks and/or processors and/or microcontrollers.

The interaction method and apparatus for a media object in a media library, an electronic device and a storage medium provided by the embodiments of the present disclosure are described below in connection with a plurality of examples.

In some technical solutions, since most users are vague about the overall status of the media objects of the terminal, it may be impossible for the users to determine which media objects have been processed or unprocessed. Take uploading of a local album as an example, when uploading photos in the local album, a user usually manually selects photos to be uploaded by himself, however, in the process of selecting the photos to be uploaded, the user is vague about the overall status of the photos in the local album and maybe cannot determine which photos have not been uploaded or which photos have been uploaded during batch upload, and the user might rely on memory or his own manual search to determine. This is an extra burden for the user, and the user experience is poor.

The interaction method for a media object in a media library provided by an embodiment of the present disclosure may run on a terminal device or a server. Herein, the terminal device may be a local terminal device. When the interaction method for the media object in the media library runs on the server, the interaction method for the media object in the media library may be implemented and executed based on a cloud interaction system. Herein, the cloud interaction system includes a server and a client device.

In an alternative embodiment of the present disclosure, various cloud applications, e.g., cloud media object interaction, may be run under the cloud interaction system. In the case of cloud media object interaction, for example, the cloud media object interaction refers to a cloud-based way of processing of the media object in the media library. In the operation mode of the cloud media object interaction, the operation subject of the media object interaction and the presentation subject of the display footage are separated, and the storage and operation of the interaction method for the media object in the media library are completed on the cloud server, where the media library may also be stored in the cloud server, and the client device is used for data reception, sending and display footage presentation. For example, the client device may be a display device with data transmission function near the user side, such as a mobile terminal, TV, computer, PDA, etc. However, the terminal device for performing the interaction method for the media object in the media library is the cloud server in the cloud. When performing the interaction for the media object, the user operates the client device to send an operation instruction to the cloud server, and the cloud server runs a game according to the operation instruction, encodes and compresses data such as the display footage, returns the data to the client device via network, and finally, decodes and outputs the display footage through the client device.

In an alternative embodiment of the present disclosure, the terminal device may be a local terminal device. The local terminal device stores a program such as social software and is used for presenting the display footage. The local terminal device is used for interacting with the user through the graphical user interface, i.e., routinely downloading and installing a program via the electronic device and running the program on the electronic device. The local terminal device may provide the graphical user interface to the user in a variety of ways, for example, the graphical user interface may be rendered on the display of the terminal or, alternatively, the graphical user interface may be provided to the user by holographic projection. For example, the local terminal device may include a display and a processor, the display is used for presenting the graphical user interface, the graphical user interface includes the display footage, and the processor is used for running the program, generating the graphical user interface, and controlling the display of the graphical user interface on the display.

The first terminal device may be the local terminal device as previously mentioned, or may be the client device in the cloud interaction system as previously mentioned.

FIG. 1 is a flowchart of steps of an embodiment of an interaction method for a media object in a media library provided by an embodiment of the present disclosure. In this embodiment, a graphical user interface is provided through a terminal, and the interaction method for the media object in the media library shown in this embodiment includes the following steps S101 to S104.

In the step S101, at least part of media objects in the media library are displayed on the graphical user interface.

Herein, the terminal may be a cell phone, TV, computer, PDA, etc. In an alternative embodiment, the terminal may be a local terminal device. The local terminal device stores an image editing program and is used for presenting an image processing footage. The local terminal device is used for interacting with a user through the graphical user interface, i.e., routinely downloading and installing the image editing program via the electronic device and running the image editing program on the electronic device. The local terminal device may provide the graphical user interface to the user in a variety of ways, for example, the graphical user interface may be rendered on a display of the terminal or, alternatively, the graphical user interface may be provided to the user by holographic projection. For example, the local terminal device may include a display and a processor, the display is used for presenting the graphical user interface, the graphical user interface includes the image processing footage, and the processor is used for running the program, generating the graphical user interface, and controlling the display of the graphical user interface on the display.

In the embodiment, the media library is a database on the terminal for storing the media object, the media object includes at least one of a photo, a video, a picture, a text, or audio. Alternatively, media objects in the media library may be stored separately in different databases according to different types, or all of the media objects in the media library may be stored in the same database. For example, a photo may be stored in a database corresponding to a local photo album.

In the embodiments of the present disclosure, the user may manage, upload or share the media object in the media library, and in this case, all or part of the media objects may be displayed on the graphical user interface. Take uploading of a local album as an example, part of photos in the local album are displayed on the graphical user interface, such as displaying the photos taken in September in the local album, displaying the photos taken in Guangzhou in the local album, displaying the photos taken through a certain social software in the local album, etc.

It should be noted that most users may store a large number of media objects such as photos locally. Therefore, in order to allow users to see as many media objects as possible, the media objects may be displayed in the form of thumbnails on the graphical user interface.

In the step S102, an overview panel is displayed on the graphical user interface while the media object is displayed, and an overview indicator corresponding to the media object is displayed on the overview panel.

The overview indicator is an indicator corresponding to the media object and used for characterizing the media object. The overview panel is an area or interface on the graphical user interface that provides the overview indicator for the user to comprehensively grasp the media object in the media library. In the embodiments of the present disclosure, when the media object is displayed on the graphical user interface, an overview panel including the overview indicator is also displayed. As a concrete example, the overview panel may be displayed on the left or right side of the graphical user interface, and overview indicators may be abstracted into small squares of different shapes and colors.

It should be noted that the overview indicator occupies less space on the graphical user interface, and may be mapped to the media object in a one-to-one manner (for example, a small square represents a media object), or may be mapped to the media objects in a one-to-many manner (for example, a small square represents a plurality of media objects). Therefore, the overview panel may provide an overview of most or even all media objects in the media library.

In the step S103, a corresponding state change is performed on the media object in response to an interaction operation on the media object, and at the same time, a display parameter of the corresponding overview indicator is determined.

The interaction operation may be a click operation, a press operation, a swipe operation, etc., of the user on the media object. The state of the media object may include a selected state and an unselected state. Specifically, assuming that the state of a media object is the unselected state, the state of the media object is changed from unselected to selected in response to a click operation of the user on the media object. Alternatively, a "√" is marked at the media object, indicating that the state of the media object is the selected state.

The display parameter is used for updating the display effect of the overview indicator. In the embodiments of the present disclosure, the display parameter of the overview indicator corresponding to the media object needs to be determined at the same time when the state of the media object is changed. For example, assuming that an orange color indicates the selected state, if the state of the media object is changed from unselected to selected, the display parameter of the corresponding overview indicator may be determined as the display parameter of the orange color.

In the step S104, a display effect of the corresponding overview indicator is updated according to the display parameter to characterize a state of the media object by means of the overview indicator having different display parameters on the overview panel.

The display effect refers to the color, magnification or frame selection of the overview indicator, etc. Different display parameters correspond to different display effects, and different display effects characterize different states of the media object.

In the embodiments of the present disclosure, when the state of the media object changes, the display parameter of the corresponding overview indicator is determined, and the display effect of the corresponding overview indicator is updated on the overview panel according to the display parameter, so that the different display effects may characterize the different states of the media object.

For example, assuming that the display parameter of the orange color indicates the selected state, the display parameter of the white color indicates the unselected state, and the overview indicator on the overview panel is the small square, if the state of a media object is changed from unselected to selected, the display parameter of the corresponding small square is determined to be the display parameter of the orange color, and the small square will be changed to orange based on the display parameter of the orange color, then the user may determine, based on the small orange square on the overview panel, that the media object in the media library is selected. If the state of a media object is changed from selected to unselected, the display parameter of the corresponding small square is determined to be the display parameter of the white color, and the small square will be changed to white based on the display parameter of the white color, then the user may determine, based on the small white square on the overview panel, that the media object in the media library is unselected.

In the above interaction method for the media object in the media library, at least part of the media objects in the media library are displayed on the graphical user interface, an overview panel is displayed on the graphical user interface while the media object is displayed, and an overview indicator corresponding to the media object is displayed on the overview panel, a corresponding state change is performed on the media object in response to an interaction operation on the media object, and at the same time, a display parameter of the corresponding overview indicator is determined, and then a display effect of the corresponding overview indicator is updated according to the display parameter to characterize a state of the media object by means of the overview indicator having different display parameters on the overview panel. In the embodiments of the present disclosure, the state of the media object in the media library may be comprehensively grasped based on the overview indicator displayed in different display effects on the overview panel. In this way, the user does not need to memorize or search the media object when processing the media object in the media library, reducing the user's burden and improving the user experience.

In an alternative embodiment of the present disclosure, in the step S102, the displaying on the graphical user interface the overview panel while displaying the media object, and displaying on the overview panel the overview indicator corresponding to the media object includes:

determining an arrangement order of media objects on the graphical user interface; and displaying on the graphical user interface the overview panel while displaying the media object, and displaying on the overview panel overview indicators corresponding to the media objects, herein, an arrangement order of the overview indicators is same as the arrangement order of the media objects on the graphical user interface.

In the embodiments of the present disclosure, both the media objects and the overview panel are displayed on the graphical user interface, and the arrangement order of the overview indicator on the overview panel is the same as the arrangement order of the corresponding media object on the graphical user interface. Specifically, the arrangement order of the media objects on the graphical user interface is firstly determined, and then the overview panel is displayed on the graphical user interface while the media objects are displayed, and the arrangement order of the overview indicators displayed on the overview panel is the same as the arrangement order of the media objects. For example, if the arrangement order of the media objects displayed on the graphical user interface is media A, media B, and media C, the arrangement order of overview indicators on the overview panel is the overview indicator of media A, the overview indicator of media B, and the overview indicator of media C.

In the above alternative embodiment, the arrangement order of the overview indicators on the overview panel is the same as the arrangement order of the corresponding media objects on the graphical user interface, thus facilitating the operation and understanding of the user, which may reduce the thinking process of the user and thus improve the user processing efficiency.

In an alternative embodiment of the present disclosure, the interaction method for the media object in the media library further includes:

determining the media object displayed on the graphical user interface; and marking, on the overview panel, the overview indicator corresponding to the media object displayed on the graphical user interface.

In the embodiments of the present disclosure, the media object displayed on the graphical user interface may be all or part of the media objects in the media library, and the overview indicator on the overview panel is smaller in size, so that the overview indicators corresponding to all of the media objects in the media library may typically be displayed. As an alternative example, the overview indicator corresponding to the media object displayed on the graphical user interface may be marked on the overview panel, where the marking may be done by means such as being boxed or highlighted.

Figure 2:
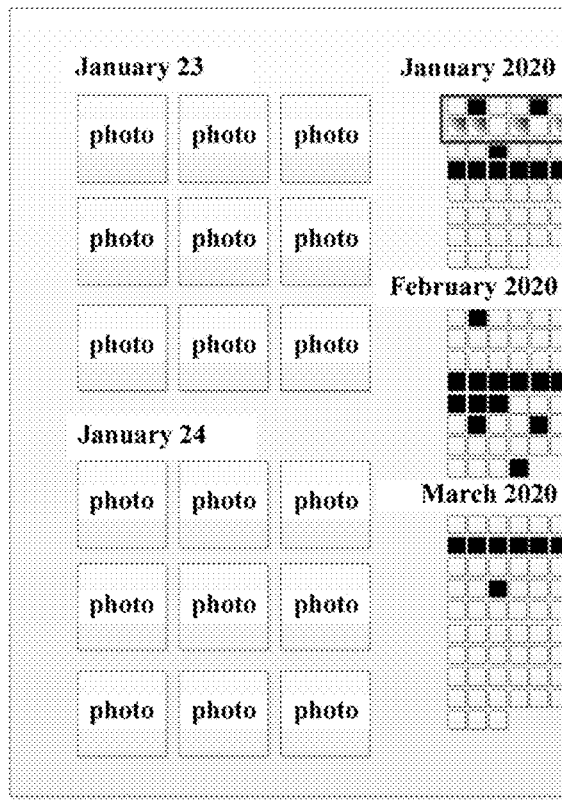
FIG. 2 is a first schematic display diagram of a graphical user interface provided by an embodiment of the present disclosure.

As a specific example, referring to FIG. 2, a schematic display diagram of a graphical user interface of a terminal is shown. In FIG. 2, part of the photos in the media library are shown on the left side and the overview area is shown on the right side. Since the photos displayed on the graphical user interface are for the month of January, the small squares corresponding to the photos for that month of January is marked out in the overview area by means of a box. It should be noted that the overview indicator boxed on the overview panel correspond to the media object displayed on the graphical user interface, and there may be some errors in practice.

In the above alternative embodiment, the overview indicator corresponding to the media object displayed on the graphical user interface is marked on the overview panel, such that the user may determine, based on the overview indicator marked on the overview panel, an approximate location of the media object displayed on the graphical user interface.

In an alternative embodiment of the present disclosure, media objects displayed on the graphical user interface are media objects displayed as an aggregation unit according to a set condition, and the displaying on the overview panel the overview indicator corresponding to the media object includes:

displaying on the overview panel overview indicators corresponding to the media objects according to the aggregation unit of the media objects.

In this embodiment, the set condition may be time, location, or social software that generates the media object, etc. Specifically, if time is used as the set condition, photos taken in the same month may be considered as an aggregation unit, and then the media objects are displayed on the graphical user interface according to the aggregation unit. For example, the media objects on the graphical user interface may be displayed according to the aggregation unit as follows: the media objects in January and the media objects in February. It should be noted that since the media object is large in size and therefore usually not all media objects in a month can be displayed on the graphical user interface. Hence, the media objects may be further displayed according to the date of the month, e.g., media objects on January 23 and media objects on January 24.

In the embodiments of the present disclosure, for the overview indicators on the overview panel, the corresponding overview indicators may similarly be aggregated to display according to the aggregation unit of the media objects. For example, the overview indicators on the overview panel may be displayed according to the aggregation unit as follows: the overview indicators corresponding to the media objects in January, and the overview indicators corresponding to the media objects in February. Please refer to FIG. 2 for details.

In the above alternative embodiment, for the media objects displayed according to the aggregation units on the graphical user interface, the overview indicators may also be displayed correspondingly on the overview panel according to the aggregation units. The media objects on the graphical user interface are synchronously displayed on the overview panel, so that the user may have a clear understanding of the overall state of the media objects in the media library with different set conditions at a glance.

In an alternative embodiment of the present disclosure, the displaying on the overview panel the overview indicator corresponding to the media object includes:

determining the state of the media object;

when the state of the media object is a processed state, determining, based on the processed state, the display parameter of the overview indicator as a first display parameter; and updating, according to the first display parameter, the display effect of the overview indicator corresponding to the media object.

In the embodiments of the present disclosure, the media object is provided with a corresponding media identifier (local identifier) for uniquely identifying the media object, a state collection is stored on the terminal, and the state collection stores the state corresponding to the media identifier of the media object in the media library. The state may include a processed state and an unprocessed state. The processed state indicates that the corresponding media object has been processed, such as uploaded, or shared. The unprocessed state indicates that the corresponding media object has not yet been processed, such as not uploaded, or not shared.

Specifically, when displaying the overview panel, the determined state is queried from the state collection based on the media identifier of the media object, herein, if the state of the media object is the processed state, the display parameter of the corresponding overview indicator is determined as the first display parameter based on the processed state, and the display effect of the corresponding overview indicator is updated based on the first display parameter. For example, if the display parameter of the overview indicator corresponding to the processed media object is determined to be a display parameter of the black color, the overview indicator may be updated to black based on the display parameter of the black color. Specific reference may be made to FIG. 2.

In the above alternative embodiment, the overview indicator of the processed media object is determined as the first display parameter on the overview panel, and the display effect of the corresponding overview indicator is changed according to the first display parameter, so that the user may determine the processed and unprocessed media object in the media library according to the overview indicator on the overview panel, and then further process the media object in the media library according to his own needs.

In an alternative embodiment of the present disclosure, in the step S103, the performing, in response to the interaction operation for the media object, the corresponding state change on the media object, and at the same time, determining the display parameter of the corresponding overview indicator includes:
  changing the state of the media object to a selected state in response to a select operation on the media object, or changing the state of the media object to an unselected state in response to a deselect operation on the media object;
  at the same time, determining, based on the selected state, the display parameter of the overview indicator as a second display parameter, or determining, based on the unselected state, the display parameter of the overview indicator as a third display parameter.

In this embodiment, the interaction operation includes a select operation and a deselect operation.

In the embodiments of the present disclosure, the user may interact with the media object by clicking, etc., and then change the state of the media object based on the interaction. Specifically, assuming that the state of the media object is the unselected state, the state of the media object may be changed to the selected state after the user performs the select operation as the interaction operation, or, assuming that the state of the media object is the selected state, the state of the media object may be changed to the unselected state after the user performs the deselect operation as the interaction operation.

In the embodiments of the present disclosure, the corresponding display parameter will be further determined based on the state of the media object after the interaction operation. Specifically, if the media object is unselected, the display parameter of the corresponding overview indicator may be determined as the second display parameter, such as a display parameter of the white color, and if the media object is selected, the display parameter of the corresponding overview indicator may be determined as the third display parameter, such as a display parameter of the orange color.

In the above embodiment, the state of the media object is changed to the selected or unselected state after the interaction operation on the media object, the corresponding second display parameter and third display parameter are determined based on the selected state and unselected state respectively, and the display effect of the corresponding overview indicator on the overview panel is changed according to the display parameter, so that the user may determine the selected status of the media object in the media library based on different display effects.

In an alternative embodiment of the present disclosure, the graphical user interface includes an overview mode control, and the displaying on the graphical user interface the overview panel while displaying the media object includes:
  displaying, in response to a touch operation acting on the overview mode control, the overview panel while displaying the media object on the graphical user interface; or
  displaying, in response to a trigger gesture acting on the graphical user interface, the overview panel while displaying the media object on the graphical user interface.

As an example, the overview panel may not be displayed on the graphical user interface in the default state. In the embodiments of the present disclosure, the overview panel may be evoked by the user in the default state, and the overview panel will be displayed on the graphical user interface for display. Alternatively, the overview panel may be awakened by means such as a click or a gesture.

Figure 3:
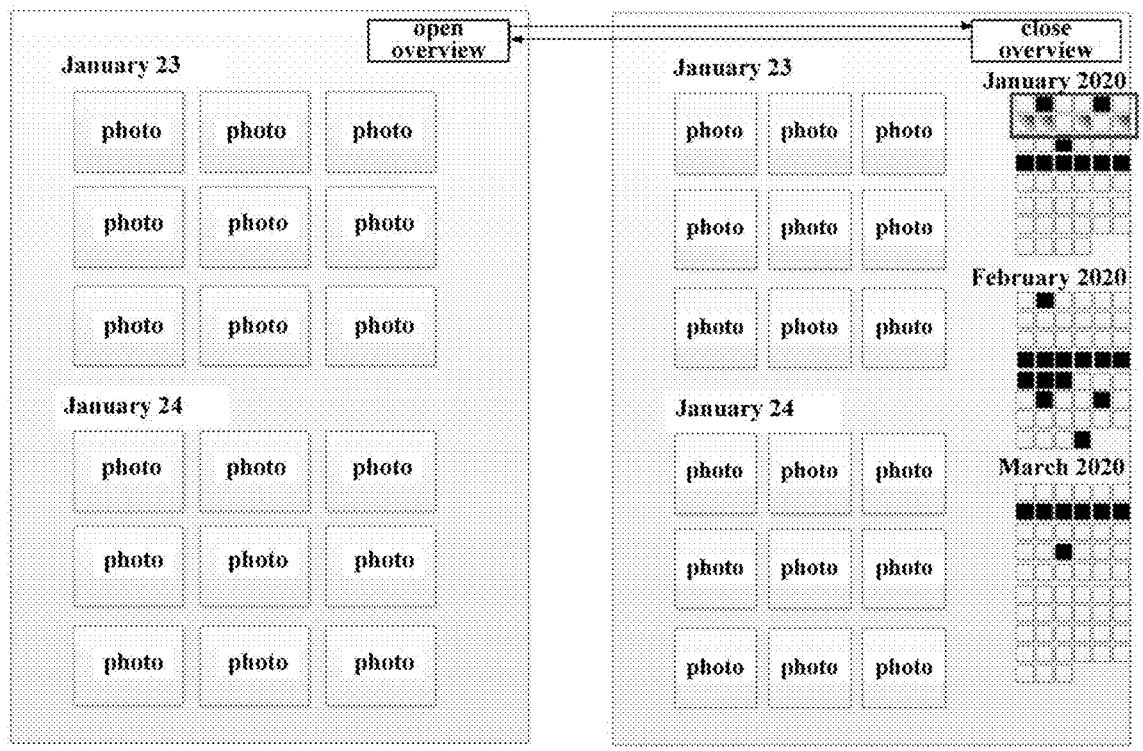
FIG. 3 is a second schematic display diagram of a graphical user interface provided by an embodiment of the present disclosure.

For the cases of the overview panel being awakened by means of the click: referring to FIG. 3, an "open overview" control (button) is displayed on the upper right corner of the graphical user interface in the default state, and if the user clicks on the "open overview" control, the overview panel will be displayed on the right side of the graphical user interface. At this time, the "open overview" control changes to a "close overview" control. If the user clicks on the "close overview" control, the overview panel will be hidden on the right side of the graphical user interface.

Figure 4:
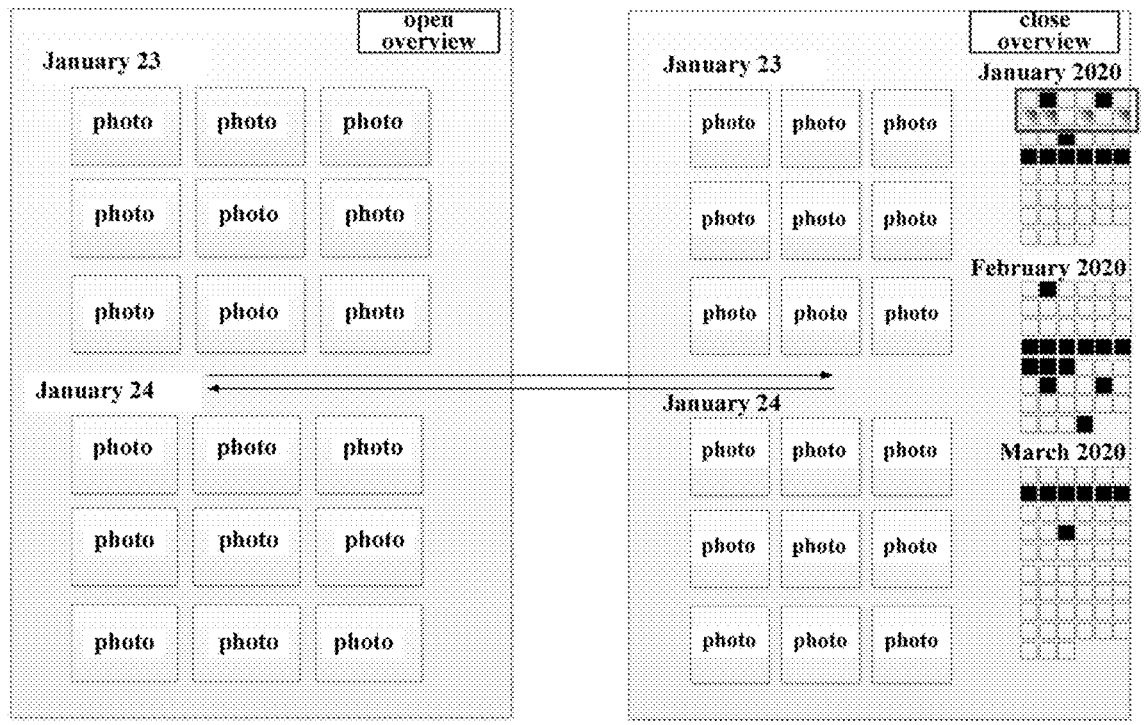
FIG. 4 is a third schematic display diagram of a graphical user interface provided by an embodiment of the present disclosure.

For the cases of the overview panel being awakened by means of the gesture: referring to FIG. 4, the overview panel is not displayed on the graphical user interface in the default state, and when the user performs the trigger gesture of swiping to the left on the graphical user interface, the overview panel will be displayed on the right side of the graphical user interface in response to the trigger gesture, and when the user performs the trigger gesture of swiping to the right on the graphical user interface, the overview panel will be hidden on the right side of the graphical user interface in response to the trigger gesture.

In the above embodiment, an obvious entry (overview mode control) is provided on the graphical user interface, which facilitates the user to determine whether to display the overview panel according to the needs, and in addition, other ways such as gestures may be used to trigger the display of the overview panel, making the operation more diversified.

In an alternative embodiment of the present disclosure, before the displaying on the overview panel the overview indicator corresponding to the media object, the interaction method for the media object in the media library further includes:
  obtaining a thumbnail of the media object by minifying the media object on the graphical user interface; and
  displaying the thumbnail of the media object on the graphical user interface.

In the embodiments of the present disclosure, while displaying the overview panel, the media object on the graphical user interface may be minified, and then there will be some additional blank space on the graphical user interface to display the overview panel. Specifically, referring to FIG. 3 and FIG. 4, it can be seen that there are certain differences in the size of the photos on the graphical user interface before and after displaying the overview panel.

In the above embodiment, while displaying the overview panel, the media object on the graphical user interface is minified so that some empty space is available to display the overview panel. In this way, there is no need to change other existing functional controls on the graphical user interface, and therefore there is no impact on the original functions or interaction.

In an alternative embodiment of the present disclosure, the media object and the overview panel displayed on the graphical user interface may be linked. For example, assuming that the media object is displayed on the left side of the graphical user interface and the overview panel is displayed on the right side of the graphical user interface, if the media object on the left is slid, the overview panel on the right side is also slid, and conversely, if the overview panel on the right side is slid, the media object on the left side are also slid.

Specifically, for the cases of the media object and the overview panel being linked, the interaction method for the media object in the media library further includes:

changing, in response to a slide operation acting on the media object, the media object displayed on the graphical user interface; and marking, on the overview panel, overview indicator corresponding to the changed media object displayed on the graphical user interface.

In the embodiments of the present disclosure, the media objects and the overview panel displayed on the graphical user interface are aligned at the top, the first media object among the media objects corresponds to one of the overview indicators in the first row of the overview panel, the first media object in the upper left corner is monitored in real time while the media objects displayed on the graphical user interface are slid, and when the media objects displayed on the graphical user interface are changed, the overview indicator corresponding to the changed first media object in the upper left corner is determined based on the media identifier of the changed first media object, so that the corresponding overview indicators may be located and marked on the overview panel.

For the cases of the media object and the overview panel being linked, the interaction method for the media object in the media library further includes:

changing, in response to a slide operation acting on the overview panel, overview indicator marked on the overview panel; and locating, on the graphical user interface, media object corresponding to the changed overview indicator marked on the overview panel.

Similarly, the first overview indicator in the upper left corner is monitored in real time while the overview indicator on the overview panel is slid, and when the overview indicator marked on the overview panel is changed, the media object corresponding to the changed first overview indicator is determined on the graphical user interface based on the media identifier of the changed first overview indicator, so that the corresponding media object may be marked on the graphical user interface, for example, the media object may be located to the topmost part of the graphical user interface.

Figure 5:
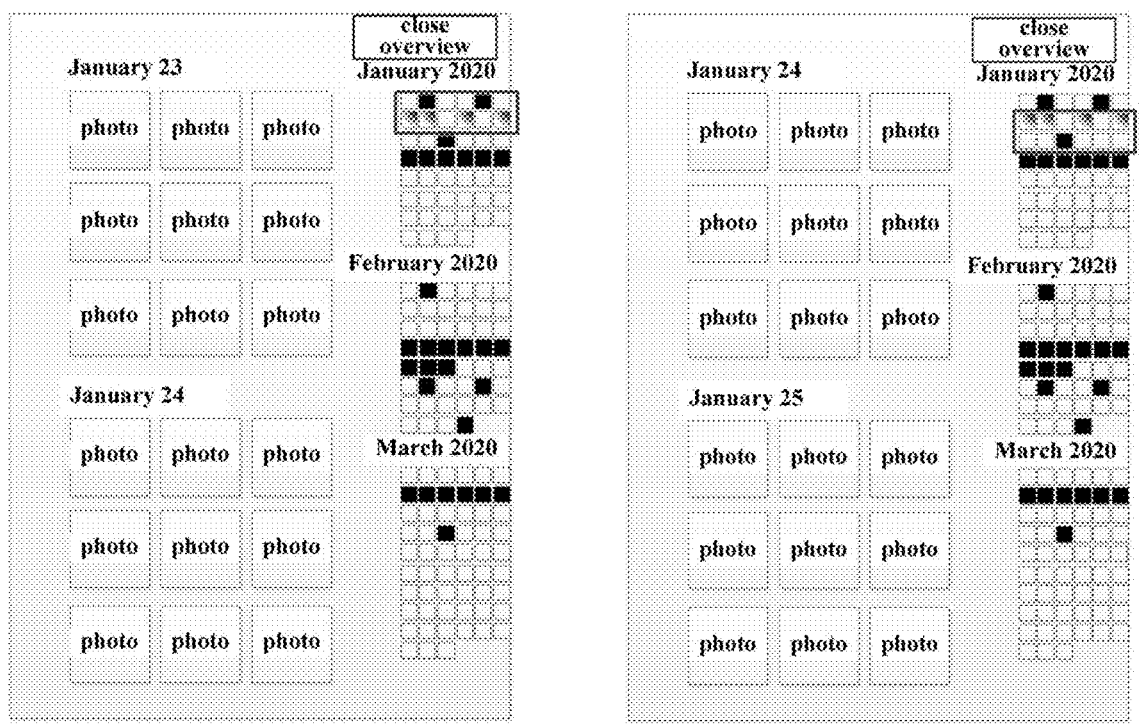
FIG. 5 is a fourth schematic display diagram of a graphical user interface provided by an embodiment of the present disclosure.

In the embodiments of the present disclosure, the media object displayed on the graphical user interface is changed by sliding the media object or the overview panel on the graphical user interface to achieve linkage. Referring to FIG. 5, the media objects displayed on the graphical user interface before the slid operation are photos of "January 23" and "January 24", then the small squares corresponding to the relatively earlier part of January are selected by the box, and the media objects displayed on the graphical user interface after the slid operation are photos of "January 24" and "January 25", then the small squares corresponding to the relatively later part of January are selected by the box.

In the above embodiment, the media object and the overview panel on the graphical user interface are linked, i.e., when one side changes, the other side changes in a linkage manner. In addition, the overview indicator displayed on the overview panel is smaller than the media object displayed on the graphical user interface, so the overview indicators are displayed more densely. Therefore, by sliding the overview panel, the change efficiency of the media object displayed on the graphical user interface is improved, enabling the user to locate the media object to be displayed in a relatively short amount of time.

In an alternative embodiment of the present disclosure, the interaction method for the media object in the media library further includes:

determining, in response to a touch operation acting on a position of the overview panel, overview indicator corresponding to the position; and locating, on the graphical user interface, media object corresponding to the overview indicator of the position.

In the embodiments of the present disclosure, the corresponding media object is quickly located and displayed on the graphical user interface by performing the touch operation on the overview indicator on the overview panel. Specifically, when a click operation is performed on a position of the overview panel, the media identifier corresponding to the overview indicator at the location may be obtained, and then the corresponding media object in the media library may be located based on the media identifiers, and then the media object is displayed on the graphical user interface, for example, at the topmost upper left corner of the graphical user interface.

In the above embodiment, the corresponding media object in the media library is located and displayed on the graphical user interface by displaying the module identifier on the overview panel, enabling the user to process the media object, which in turn improves the processing efficiency of the user on the media object in the media library.

In an alternative embodiment of the present disclosure, the graphical user interface includes an overview mode entry control, and the displaying on the graphical user interface the overview panel while displaying the media object includes:

displaying, in response to a touch operation acting on the overview mode entry control, the overview panel on the graphical user interface while displaying the media object, wherein the overview panel is suspended above the media object.

Figure 6:
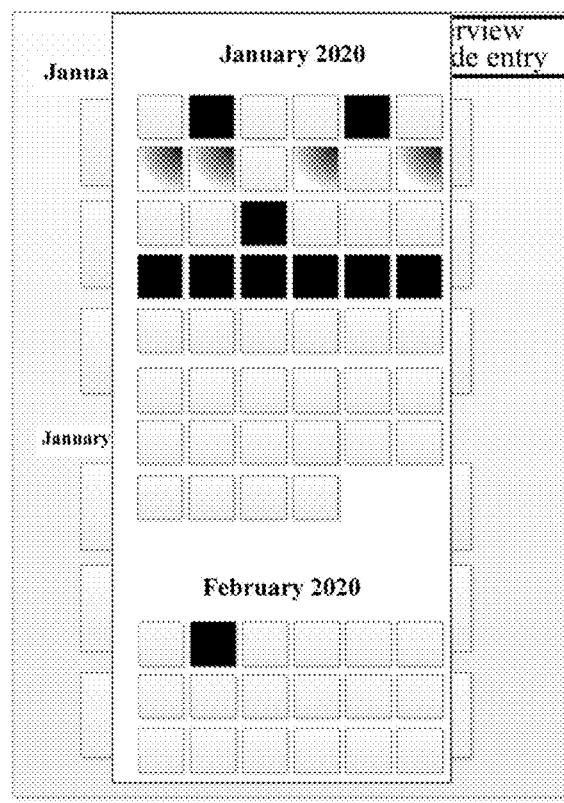
FIG. 6 is a fifth schematic display diagram of a graphical user interface provided by an embodiment of the present disclosure.

In the embodiments of the present disclosure, the overview panel may be displayed in a drawer format in addition to being displayed in an empty space of the graphical user interface. Specifically, referring to FIG. 6, an "overview mode entry" control is displayed on the graphical user interface. When the user clicks on the "overview mode entry" control, the overview panel is popped up, the overview panel is displayed in a suspension manner above the photo displayed on the graphical user interface, and the media object displayed on the graphical user interface may be maintained at the size before the overview panel is displayed, i.e., there is no need to minify the media object when the overview panel is displayed.

In the above embodiment, the overview panel is displayed in a suspension manner above the media object displayed on the graphical user interface, so that the media object does not need to be minified, and the overview panel is larger, which facilitates the user to have a better overview of the overall condition of the media objects in the media library.

In an alternative embodiment of the present disclosure, the interaction method for the media object in the media library further includes:

displaying numbers corresponding to media objects in different states on the overview panel.

Figure 7:
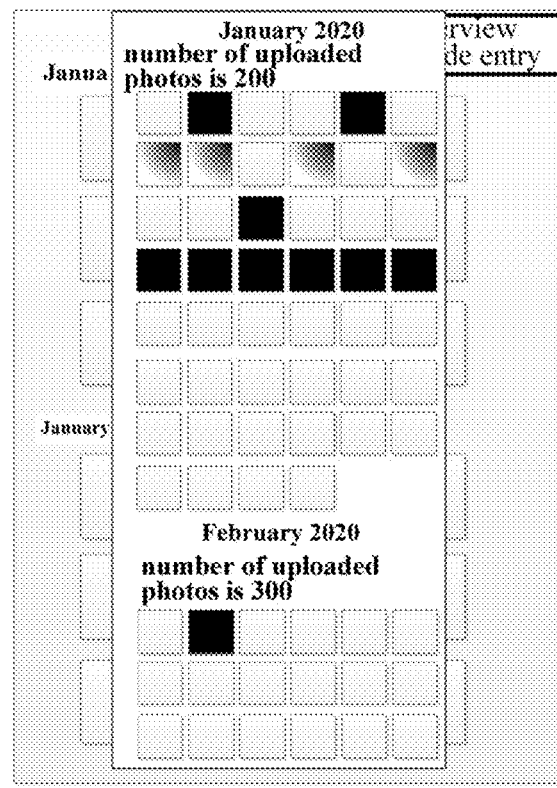
FIG. 7 is a sixth schematic display diagram of a graphical user interface provided by an embodiment of the present disclosure.

In the embodiments of the present disclosure, the numbers of the media objects in different states may be displayed on the overview panel. As a specific example, the state of the media object may include a processed state, a selected state, and an unselected state. The numbers of the media objects corresponding to each state are counted, and then may be displayed on the overview panel. Alternatively, the states of the media objects for each aggregation unit are counted. Referring to FIG. 7, the corresponding number is displayed at each aggregation unit on the overview panel. For example, if the number of photos with the uploaded state in January is 200, the number of the uploaded photos may be displayed at the aggregation unit of the overview indicators in January on the overview panel as 200, and if the number of photos with the uploaded state in February is 300, the number of the uploaded photos may be displayed at the aggregation unit of the overview indicators in February on the overview panel as 300.

In the above embodiment, the numbers of the media objects in different states are displayed on the overview panel, enabling the user to more accurately grasps the condition of the media objects in the media library.

In an alternative embodiment of the present disclosure, the interaction method for the media object in the media library further includes:

displaying on the graphical user interface a time axis with an overview mark, and determining a display parameter of the overview mark according to the state of the media object; and updating, according to the display parameter, a display effect of the overview mark to characterize the state of the media object by means of the overview mark having different display parameters on the time axis. As an example, 2px (pixels) may correspond to a day on the time axis.

In the embodiments of the present disclosure, the time axis is displayed on the graphical user interface while the media object is displayed, and the time axis is provided with the overview mark. The overview mark may mark the media object at a certain point in time (e.g., a day). The display effect of the overview mark is changed based on different display parameters so that the state of the media object at that point in time may be characterized according to different display effects.

Figure 8:
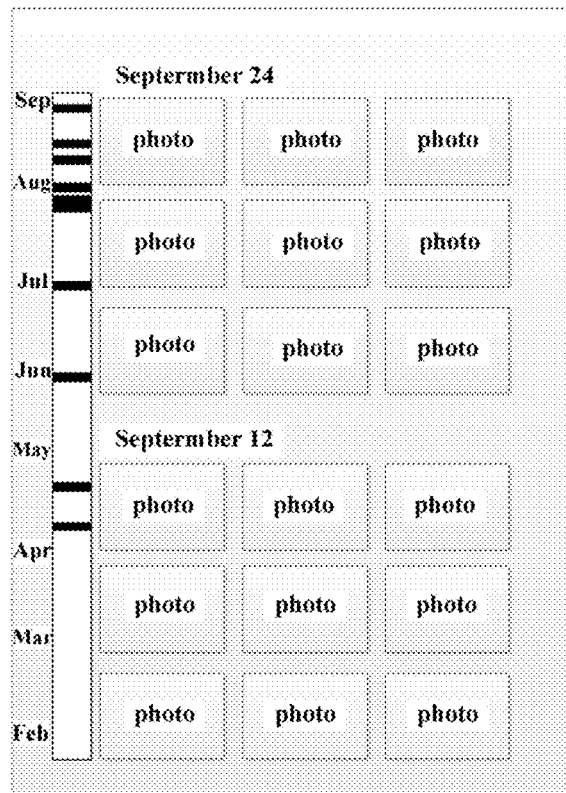
FIG. 8 is a seventh schematic display diagram of a graphical user interface provided by an embodiment of the present disclosure.

Referring to FIG. 8, the time axis is displayed on the left side and the photos displayed on the graphical user interface are displayed on the right side. Assuming that a photo in the processed state exists on a day of a month on the time axis, the display parameter of the overview mark at that point in time is determined to be a display parameter of the black color, and then the display effect of the corresponding overview mark displayed on the overview panel is changed to black according to the display parameter of the black color.

It should be noted that the time axis and the media object on the graphical user interface are linked in the embodiments of the present disclosure. For example, assuming that the media object is displayed on the left side of the graphical user interface and the time axis is displayed on the right side of the graphical user interface, if the media object on the right side is changed, the overview mark of the time axis on the left side will also be changed. Conversely, if the media object on the right side is changed, the time axis on the left side will also be changed.

In the above embodiment, the media object and the time axis on the graphical user interface are linked, i.e., when one side changes, the other side changes in a linkage manner. In addition, the overview mark displayed on the time axis is smaller than the media object displayed on the graphical user interface, so the overview marks are displayed at a higher density. Hence, by displaying the module mark on the overview panel of the time axis, the user may be able to grasp the state of media object in the media library in a relatively short amount of time.

In summary, the embodiments of the present disclosure have at least the following advantages: 1. an obvious overview entry is displayed on the graphical user interface, facilitating the user to determine whether to display the overview panel through the overview entry according to his own needs, and the overview panel has no impact on the original functions or interaction; 2. the overview indicator abstracted to be in the form of the small square, etc., is displayed on the overview panel, and the state of the corresponding media object is characterized by different display effects, enabling the user to have a clear understanding of the media objects in the media library at a glance; 3. the media objects and overview indicators are aggregated into aggregation units and displayed according to specified conditions, and the media objects displayed on the graphical user interface are synchronously displayed and marked on the overview panel; 4. the media object and the overview panel on the graphical user interface are linked, and since the overview indicators on the overview panel are displayed more densely, through the overview panel, the media object in the media library may be located quickly in a relatively short amount of time and displayed on the graphical user interface.

It should be noted that for the purpose of simple description, the method embodiments are all expressed as a series of action combinations. However, those skilled in the art should be aware that the embodiments of the present disclosure are not limited by the described order of the actions, as according to the embodiments of the present disclosure, certain steps may be performed in other sequences or simultaneously. In addition, those skilled in the art should also be aware that the embodiments described in the specification are all preferred embodiments, and the actions involved may not necessarily be necessary for the embodiments of the present disclosure.

Figure 9:
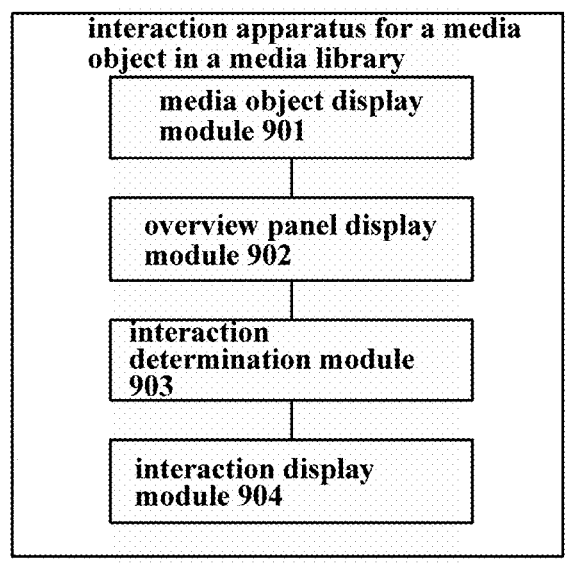
FIG. 9 is a structure block diagram of an embodiment of an interaction apparatus for a media object in a media library provided by an embodiment of the present disclosure.

Referring to FIG. 9, a structure block diagram of an embodiment of an interaction apparatus for a media object in a media library provided by an embodiment of the present disclosure is shown. In this embodiment, a graphical user interface is provided through a terminal, the apparatus in the embodiment of the present disclosure may specifically include the following modules:

a media object display module 901, configured to execute displaying on the graphical user interface at least part of media objects in the media library;

an overview panel display module 902, configured to execute displaying on the graphical user interface an overview panel while displaying the media object, and displaying on the overview panel an overview indicator corresponding to the media object;

an interaction determination module 903, configured to execute performing, in response to an interaction operation on the media object, a corresponding state change on the media object, and at the same time, determining a display parameter of corresponding overview indicator; and an interaction display module 904, configured to execute updating, according to the display parameter, a display effect of the corresponding overview indicator to characterize a state of the media object by means of the overview indicator having different display parameters on the overview panel.

In an alternative embodiment of the present disclosure, the overview panel display module 902 is configured to execute determining an arrangement order of media objects on the graphical user interface, displaying on the graphical user interface the overview panel while displaying the media object, and displaying on the overview panel overview indicators corresponding to the media objects, herein, an arrangement order of the overview indicators is same as the arrangement order of the media objects on the graphical user interface.

In an alternative embodiment of the present disclosure, the interaction apparatus for the media object in the media library further includes a mark module, configured to execute determining the media object displayed on the graphical user interface, and marking, on the overview panel, the overview indicator corresponding to the media object displayed on the graphical user interface.

In an alternative embodiment of the present disclosure, the interaction display module 904 is configured to execute displaying on the overview panel overview indicators corresponding to the media objects according to the aggregation unit of the media objects.

In an alternative embodiment of the present disclosure, the media object and the overview indicator are in one-to-one correspondence.

In an alternative embodiment of the present disclosure, the interaction display module 904 is configured to execute: determining the state of the media object; when the state of the media object is a processed state, determining, based on the processed state, the display parameter of the overview indicator as a first display parameter; and updating, according to the first display parameter, the display effect of the overview indicator corresponding to the media object.

In an alternative embodiment of the present disclosure, the interaction operation includes a select operation and a deselect operation, and the interaction determination module 903 is configured to execute: changing the state of the media object to a selected state in response to the select operation on the media object, or changing the state of the media object to an unselected state in response to the deselect operation on the media object; and at the same time, determining, based on the selected state, the display parameter of the overview indicator as a second display parameter, or determining, based on the unselected state, the display parameter of the overview indicator as a third display parameter.

In an alternative embodiment of the present disclosure, the graphical user interface includes an overview mode control, and the overview panel display module 902 is configured to execute: displaying, in response to a touch operation acting on the overview mode control, the overview panel while displaying the media object on the graphical user interface; or displaying, in response to a trigger gesture acting on the graphical user interface, the overview panel while displaying the media object on the graphical user interface.

In an alternative embodiment of the present disclosure, the interaction apparatus for the media object in the media library further includes a minify processing module, configured to execute: obtaining a thumbnail of the media object by minifying the media object on the graphical user interface; and displaying the thumbnail of the media object on the graphical user interface.

In an alternative embodiment of the present disclosure, the interaction apparatus for the media object in the media library further includes a first linking module, configured to execute: changing, in response to a slide operation acting on the media object, a media object displayed on the graphical user interface; and marking, on the overview panel, an overview indicator corresponding to the changed media object displayed on the graphical user interface.

In an alternative embodiment of the present disclosure, the interaction apparatus for the media object in the media library further includes a second linking module, configured to execute: changing, in response to a slide operation acting on the overview panel, an overview indicator marked on the overview panel; and locating, on the graphical user interface, a media object corresponding to the changed overview indicator marked on the overview panel.

In an alternative embodiment of the present disclosure, the interaction apparatus for the media object in the media library further includes a locating module, configured to execute: determining, in response to a touch operation acting on a position of the overview panel, an overview indicator corresponding to the position; and locating, on the graphical user interface, a media object corresponding to the overview indicator of the position.

In an alternative embodiment of the present disclosure, the graphical user interface includes an overview mode entry control, and the overview panel display module 902 is configured to execute displaying, in response to a touch operation acting on the overview mode entry control, the overview panel on the graphical user interface while displaying the media object, herein, the overview panel is suspended above the media object.

In an alternative embodiment of the present disclosure, the overview panel display module 902 is configured to execute displaying numbers corresponding to media objects in different states on the overview panel.

In an alternative embodiment of the present disclosure, the interaction apparatus for the media object in the media library further includes a time axis display module, configured to execute: displaying on the graphical user interface a time axis with an overview mark, and determining a display parameter of the overview mark according to the state of the media object; and updating, according to the display parameter, a display effect of the overview mark to characterize the state of the media object by means of the overview mark having different display parameters on the time axis.

In an alternative embodiment of the present disclosure, the media object includes at least one of: a photo, a video, a picture, a text or audio.

In the embodiments of the present disclosure, at least part of the media objects in the media library are displayed on the graphical user interface, an overview panel is displayed on the graphical user interface while the media object is displayed, and an overview indicator corresponding to the media object is displayed on the overview panel, a corresponding state change is performed on the media object in response to an interaction operation on the media object, and at the same time, a display parameter of the corresponding overview indicator is determined, and then a display effect of the corresponding overview indicator is updated according to the display parameter to characterize a state of the media object by means of the overview indicator having different display parameters on the overview panel. In the embodiments of the present disclosure, the state of the media object in the media library may be comprehensively grasped based on the overview indicator displayed in different display effects on the overview panel. In this way, the user does not need to memorize or search the media object when processing the media object in the media library, reducing the user's burden and improving the user experience.

The interaction apparatus for the media object in the media library described in the embodiments of the present disclosure may be used to perform the technical solutions in each of the corresponding method embodiments described above, with similar implementation principles and technical effects. The functions of each module may be referred to the corresponding descriptions in the method embodiments, which will not be repeated here.

The embodiments of the present disclosure also provide an electronic device, including a processor, a memory and a computer program stored in the memory and capable of running on the processor. The computer program may be executed by the processor to implement the method shown in any of the above embodiments, the specific implementation and beneficial effects of which may be seen above and will not be repeated here.

The embodiments of the present disclosure also provide a computer-readable storage medium, storing a computer program. The computer program may be executed by a processor to implement the method shown in any of the above embodiments, the specific implementation and beneficial effects of which may be seen above and will not be repeated herein.

It will be understood by those ordinary skilled in the art that all or some of the steps to implement each of the above method embodiments may be accomplished by hardware associated with the program instructions. The aforementioned computer program may be stored in a computer-readable storage medium. The program, when executed, implements the steps including each method embodiment described above. The aforementioned storage medium includes: a read-only memory (ROM), random access memory (RAM), disk or CD-ROM, and various other media that can store the program code.

Finally, it should be noted that the above embodiments are used only to illustrate the technical solutions of the present disclosure and not to limit them. Although the present disclosure is described in detail with reference to the preceding embodiments, it should be understood by those ordinary skilled in the art that it is still possible to modify the technical solutions described in the preceding embodiments or to make equivalent substitutions for some or all of the technical features thereof. These modifications or substitutions do not make the essence of the corresponding technical solutions out of the scope of the technical solutions of the embodiments of the present disclosure.

The invention claimed is:

1. An interaction method for a media object in a media library, comprising:
    displaying, on a graphical user interface provided by a terminal, the media object in the media library;
    displaying on the graphical user interface an overview panel while displaying the media object, and displaying on the overview panel an overview indicator corresponding to the media object; wherein the overview indicator is a color lump graphic indicator;
    performing, in response to an interaction operation on the media object, a corresponding state change on the media object, and determining a display parameter of the overview indicator; and
    updating, according to a value of the display parameter, a display effect of the overview indicator, wherein different values of the display parameter correspond to different display effects, and the different display effects correspond to different states of the media object;
    wherein displaying on the overview panel the overview indicator comprises:
    determining a state of the media object, wherein the state of the media object comprises a processed state and an unprocessed state, the processed state indicates that the media object is processed, and the unprocessed state indicates that the media object is not processed;
    determining, in response to the state of the media object being the processed state, the display parameter of the overview indicator taking a first value; and
    updating, according to the first value, the display effect of the overview indicator;
    wherein the processed state comprises an uploaded state, and the unprocessed state comprises a non-uploaded state; or the processed state comprises a shared state, and the unprocessed state comprises an unshared state.

2. The method according to claim 1, wherein the displaying on the overview panel the overview indicator comprises:
    determining an arrangement order of media objects on the graphical user interface; and
    displaying on the overview panel overview indicators corresponding to the media objects, wherein an arrangement order of the overview indicators is same as the arrangement order of the media objects on the graphical user interface.

3. The method according to claim 2, wherein the media object and the overview indicator are in one-to-one correspondence.

4. The method according to claim 1, further comprising:
    determining the media object displayed on the graphical user interface; and
    marking, on the overview panel, the overview indicator corresponding to the media object displayed on the graphical user interface.

5. The method according to claim 1, wherein media objects are displayed with categorized aggregation under a preset condition on the graphical user interface, and the displaying on the overview panel the overview indicator comprises:
    displaying, with categorized aggregation under the preset condition, overview indicators corresponding to the media objects on the overview panel.

6. The method according to claim 1, wherein the interaction operation comprises at least one of a select operation or a deselect operation, and the performing the corresponding state change on the media object, and determining the display parameter of the corresponding overview indicator comprises:
    changing the state of the media object to a selected state in response to the select operation on the media object, and determining, based on the selected state, the display parameter of the overview indicator taking a second value; or
    changing the state of the media object to an unselected state in response to the deselect operation on the media object, and determining, based on the unselected state, the display parameter of the overview indicator taking a third value.

7. The method according to claim 1, wherein the graphical user interface comprises an overview mode control, and the displaying on the graphical user interface the overview panel comprises:
displaying, in response to a touch operation acting on the overview mode control, the overview panel on the graphical user interface; or
displaying, in response to a trigger gesture acting on the graphical user interface, the overview panel on the graphical user interface.

8. The method according to claim 1, further comprising:
obtaining a thumbnail of the media object by minifying the media object on the graphical user interface; and
displaying the thumbnail of the media object on the graphical user interface.

9. The method according to claim 1, further comprising:
displaying, in response to a slide operation acting on the media object, another media object on the graphical user interface; and
marking, on the overview panel, another overview indicator corresponding to the another media object.

10. The method according to claim 1, further comprising:
displaying, in response to a slide operation acting on the overview panel, another overview indicator marked on the overview panel; and
locating, on the graphical user interface, another media object corresponding to the another overview indicator.

11. The method according to claim 1, further comprising:
determining, in response to a touch operation acting on a position of the overview panel, another overview indicator corresponding to the position; and
locating, on the graphical user interface, another media object corresponding to the another overview indicator of the position.

12. The method according to claim 1, wherein the graphical user interface comprises an overview mode entry control, and the displaying on the graphical user interface the overview panel comprises:
displaying, in response to a touch operation acting on the overview mode entry control, the overview panel in a suspended way above the media object on the graphical user interface.

13. The method according to claim 1, further comprising:
displaying numbers corresponding to media objects in different states on the overview panel.

14. The method according to claim 1, further comprising:
displaying on the graphical user interface a time axis with an overview mark, and determining a display parameter of the overview mark according to the state of the media object; and
updating, according to the display parameter of the overview mark, a display effect of the overview mark, wherein different values of the display parameter of the overview mark correspond to different display effects of the overview mark, and the different display effects of the overview mark correspond to different states of the media object.

15. The method according to claim 1, wherein the media object comprises at least one of: a photo, a video, a picture, a text or audio.

16. The method according to claim 1, wherein a number of the color lump graphic indicator displayed on the overview panel of a current display interface is greater than a number of the media object displayed on the graphical user interface of the current display interface.

17. An electronic device, comprising:
a processor, a memory and a computer program stored in the memory and capable of running on the processor, wherein the processor, through executing the computer program, is configured to:
display on a graphical user interface a media object in a media library;
display on the graphical user interface an overview panel while displaying the media object, and display on the overview panel an overview indicator corresponding to the media object; wherein the overview indicator is a color lump graphic indicator;
perform, in response to an interaction operation on the media object, a corresponding state change on the media object, and determine a display parameter of the overview indicator; and
update, according to a value of the display parameter, a display effect of the overview indicator, wherein different values of the display parameter correspond to different display effects, and the different display effects correspond to different states of the media object;
wherein the processor is specifically configured to:
determine a state of the media object, wherein the state of the media object comprises a processed state and an unprocessed state, the processed state indicates that the media object is processed, and the unprocessed state indicates that the media object is not processed;
determine, in response to the state of the media object being the processed state, the display parameter of the overview indicator taking a first value; and
update, according to the first value, the display effect of the overview indicator;
wherein the processed state comprises an uploaded state, and the unprocessed state comprises a non-uploaded state; or the processed state comprises a shared state, and the unprocessed state comprises an unshared state.

18. The electronic device according to claim 17, wherein a number of the color lump graphic indicator displayed on the overview panel of a current display interface is greater than a number of the media object displayed on the graphical user interface of the current display interface.

19. A non-transitory computer-readable storage medium, storing a computer program, wherein the computer program, when executed by a processor, causes the processor to perform an interaction method for a media object in a media library, wherein the method comprises:
displaying on a graphical user interface the media object in the media library;
displaying on the graphical user interface an overview panel while displaying the media object, and displaying on the overview panel an overview indicator corresponding to the media object; wherein the overview indicator is a color lump graphic indicator;
performing, in response to an interaction operation on the media object, a corresponding state change on the media object, and determining a display parameter of the corresponding overview indicator; and
updating, according to a value of the display parameter, a display effect of the overview indicator, wherein different values of the display parameter correspond to different display effects, and the different display effects correspond to different states of the media object;

wherein displaying on the overview panel the overview indicator comprises:

determining a state of the media object, wherein the state of the media object comprises a processed state and an unprocessed state, the processed state indicates that the media object is processed, and the unprocessed state indicates that the media object is not processed;

determining, in response to the state of the media object being the processed state, the display parameter of the overview indicator taking a first value; and updating, according to the first value, the display effect of the overview indicator;

wherein the processed state comprises an uploaded state, and the unprocessed state comprises a non-uploaded state; or the processed state comprises a shared state, and the unprocessed state comprises an unshared state.

* * * * *